Figure 11:
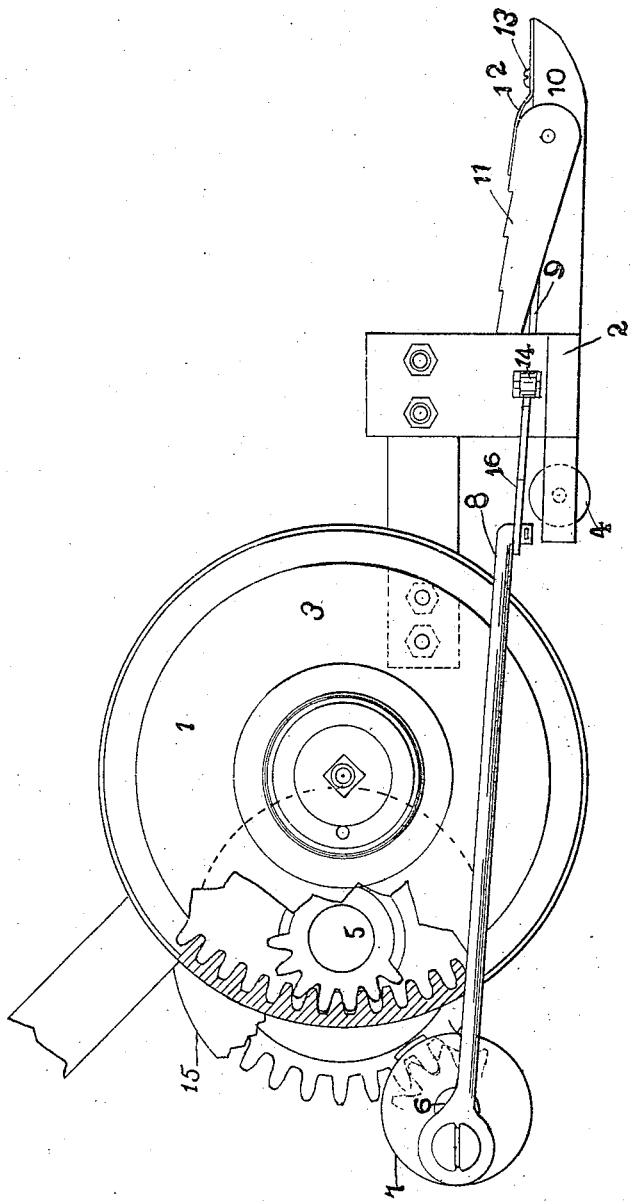

No. 843,821. PATENTED FEB. 12, 1907.
J. P. JASPER.
LAWN MOWER.
APPLICATION FILED DEC. 6, 1905.
2 SHEETS—SHEET 1.
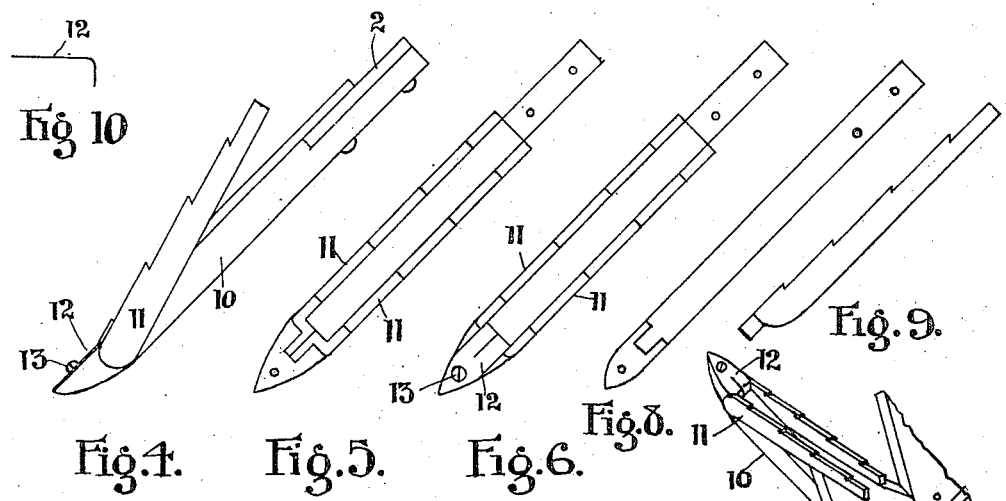
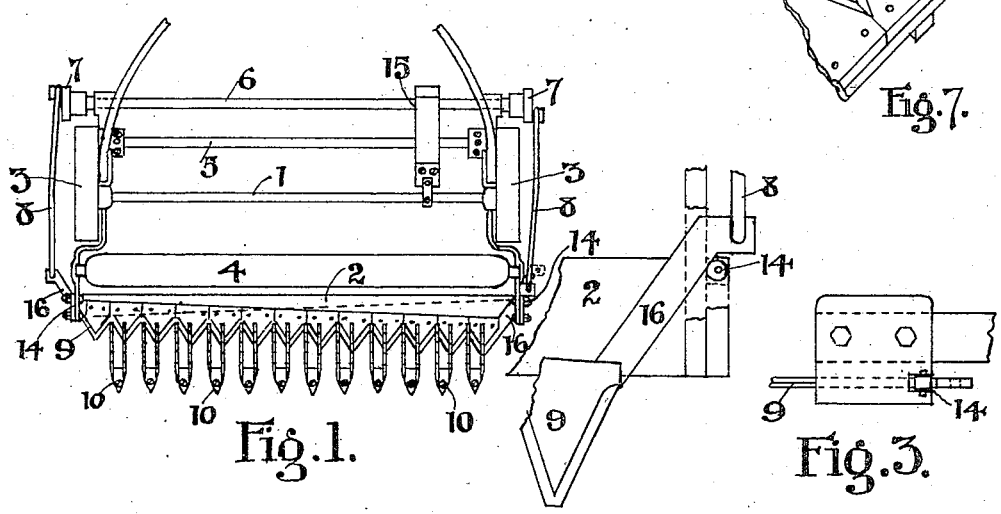
WITNESSES:
J. A. Martin-Cooke.
F. H. Kappa
INVENTOR
J. P. Jasper
BY Abraham Knobel
ATTORNEY No. 843,821. PATENTED FEB. 12, 1907.
J. P. JASPER.
LAWN MOWER.
APPLICATION FILED DEC. 6, 1905.

2 SHEETS—SHEET 2.

WITNESSES:
F. H. Kappa.
M. W. Kohler

INVENTOR
J. P. Jasper
BY
Abraham Knobel
ATTORNEY

UNITED STATES PATENT OFFICE.

JOHN P. JASPER, OF CAVE CITY, KENTUCKY.

LAWN-MOWER.

No. 843,821.  Specification of Letters Patent.  Patented Feb. 12, 1907.

Application filed December 6, 1905. Serial No. 290,640.

*To all whom it may concern:*

Be it known that I, JOHN P. JASPER, a citizen of the United States, residing at Cave City, in the county of Barren and State of Kentucky, have invented a new and useful Lawn-Mower, of which the following is a specification.

This invention relates to mowing-machines, and more particularly to lawn-mowers; and the objects of my improvement are ease of operation, cleanness of cutting; to provide a lawn-mower which shall cut grass that is too high for the ordinary lawn-mower; to prevent clogging and wrapping of grass about the working parts, to preserve the sharp edges of the sickle longer than heretofore; to provide an oscillatory as well as reciprocatory motion of the sickle and a consequent draw cut as well as shear cut. These objects I attain by means of the mechanism illustrated in the accompanying drawings, in which—

Figure 1 is a plan view; Fig. 2, a detail view of a portion of the cutter-bar, showing the position of the antifriction-roller; Fig. 3, a detail elevation of the end of cutter-bar, showing the antifriction-roller in position; Fig. 4, a side view of one of the fingers, showing the sickle in section; Fig. 5, a plan view of a finger; Fig. 6, a plan view of a finger with the bifurcated spring in place; Fig. 7, a perspective view of one of the fingers with the sickle in position; Fig. 8, a plan view of a finger with the wings removed; Fig. 9, a side view of one of the wings; Fig. 10, an edge view of the bifurcated spring, and Fig. 11 is a side elevation.

Similar reference-numerals refer to similar parts throughout the several views of the drawings.

The driving mechanism 1, the cutter-bar 2, and the driving-wheels 3 constitute the body of the invention. The driving mechanism 1 may be of the conventional lawn-mower type, with dished driving-wheels 3, having peripheral internal gears. In the embodiment of my invention illustrated in the drawings the shaft 5 is rotated directly by the driving-wheels 3 by means of a pinion on each end. On shaft 5 is placed a gear-wheel which meshes with a pinion on an adjacent shaft 6, the gear and the pinion being inclosed in a case 15. This mechanism gives a rapid rotary motion to shaft 6. Shaft 6 is provided on either end with a pitman or crank-wheel 7. The crank-wheels 7 are so disposed on shaft 6 that the crank-pins are at one hundred and eighty degrees relative to one another. Pitman-wheels 7 are operably connected, by means of pitmen 8, with a sickle 9, mounted in a finger-bar 2 in front of the machine. A roller 4 is shown mounted just in the rear of finger-bar 2 and may be adjustable in order to cut the grass at different heights. The sickle 9 is provided at its ends with cam-shanks 16, which extends beyond the sickle-bar rearwardly at an angle and are provided at their extremities with eyes or sockets for receiving the forward ends of pitmen 8. Finger-bar 2 is provided at each end with an antifriction-roller 14, against which cam-shanks 16 are adapted to work. Finger-bar 2 is provided with fingers 10. The fingers 10 have straight sides and have the point portion elevated above the cutting-surface, and this elevated-point portion is provided with a socket adapted to receive the ends of wing 11. The forward ends of wing 11 are bent at a double right angle and adapted to work in the slot of fingers 10, provided therefor. The wings 11 are tapered rearwardly by steps.

A spring 12 is placed over the right-angled forward ends of wings 11 when they are in place and may be secured by a screw 13 or any other suitable means to prevent them from being raised out of the slot in the fingers and also from sliding forward out of said slot, being provided with a right-angular forward hook, as shown in Fig. 10. Spring 12 is bifurcated, so that half of it presses upon each of the wings 11 and keeps them gently pressed downward. The object of the wings 11 is to press the cutting edges of the sections of sickle 9 gently, continuously, and closely down upon the surface of fingers 10 and also to continually wipe the upper surface of the cutting edges of the sickle. It is obvious that thus a blade of grass that is to be cut bridges across a very narrow space between the finger and the wing and is supported on both sides of the cutting edge, causing it to be clipped off cleanly and easily. In the usual form of fingers a sufficient space must be allowed between the upper plate and the cutting-surface to enable the sickle to run freely and not be choked by grit or other matter that may be forced between the parts. This necessitates the space being so large that the grass in certain conditions instead of being clipped off is flexed into the space, with the result that the motion of the sickle is greatly retarded or stopped. My improvement avoids this difficulty, because the upper and lower parts of the finger being always kept close together over and wiping the cutting edge of the sickle the cutting edge is sharpened and the blade of grass is supported immediately at and on each side of the cutting edge and is clipped off clean instead of being pushed into the space. If it should occur that grass or other substance is drawn in instead of being cut off, the wings 11 yield under the pressure of spring 12 and allow the grass or other substance to pass without appreciably retarding the motion of the sickle. The steps on wings 11, tapering backward, tend to move the grass backward and prevent its moving forward and crowding the space between the fingers so as to obstruct the entrance for receiving the uncut grass. By this arrangement the cutter-bar is kept free.

Besides providing the peculiar fingers just described I have also provided for a compound oscillatory and reciprocatory motion of the sickle, which gives it a draw cut as well as a shear cut. This is accomplished by setting the crank-pins on pitman-wheels 7 at one hundred and eighty degrees, so that as one pitman 8 advances the other recedes. This would give only the oscillatory motion if the sickle were free to move only in response to the impulses given by the pitmen; but the shanks 16 of the sickle, having their outer edges at an angle of about sixty degrees relative to the sickle-bar and adapted to work against the antifriction-rollers 14, pivoted on finger-bar 2, a longitudinal reciprocatory motion is thus provided in addition to the oscillatory motion transverse to the finger-bar.

The peculiar motion of the sickle and the fingers provided with the wings described enables the operator to cut a clean smooth lawn, and the grass is not pulled, as in the present prevalent way. If the grass is jerked and pulled by the mower, the tap-roots are broken and the lawn is injured. With my improvement every sprig is cleanly clipped off as soon as reached by the cutter-bar and at once released.

Having thus described my invention, so that any one skilled in the art pertaining thereto may make and use it, I claim—

1. In a lawn-mower, the combination of driving means, a crank-shaft rotated by said driving means, a pitman at each end of said crank-shaft, a cutter-bar disposed in front of said driving means, a sickle mounted in said cutter-bar having a cam-shank extending at an angle from each end and operatively connected to said pitman, fingers mounted on said cutter-bar and wings pivoted on said fingers, substantially as specified.

2. In a mower, a driving-gear, a cutter-bar on the front of said driving-gear, a sickle mounted in said cutter-bar, cam-shanks at the ends of said sickle, a crank-shaft driven by said driving-gear, pitmen connecting said crank-shaft and said cam-shanks, antifriction cam-rollers mounted on said cutter-bar disposed in the path of said cam-shanks, substantially as specified.

JOHN P. JASPER.

Witnesses:
S. D. CALDWELL,
G. H. SMITH.